United States Patent
Yamasaki

[11] 3,990,782
[45] Nov. 9, 1976

[54] SEAL FOR LIQUID CRYSTAL DISPLAY CELL

[75] Inventor: James N. Yamasaki, Anaheim, Calif.

[73] Assignee: Beckman Instruments, Inc., Fullerton, Calif.

[22] Filed: Sept. 9, 1974

[21] Appl. No.: 504,280

[52] U.S. Cl. .......................................... 350/160 LC
[51] Int. Cl.² ........................................ G02F 1/13
[58] Field of Search ....... 350/160 LC; 277/1, 235 R

[56] References Cited
UNITED STATES PATENTS

| | | | |
|---|---|---|---|
| 3,700,306 | 10/1972 | Cartmell et al. | 350/160 LC X |
| 3,751,137 | 8/1973 | Fitzgibbons et al. | 350/160 LC |
| 3,799,649 | 3/1974 | Carlyle | 350/160 LC |
| 3,866,313 | 2/1975 | Yih | 350/160 LC X |

*Primary Examiner*—John K. Corbin
*Assistant Examiner*—Matthew W. Koren
*Attorney, Agent, or Firm*—R. J. Steinmeyer; F. L. Mehlhoff

[57] ABSTRACT

A liquid crystal display cell comprising a pair of oppositely disposed glass plates having transparent conductive electrodes formed on the facing surfaces thereof, said glass plates being joined by a seal material along the outer periphery thereof, with the seal material having a small opening formed therein for filling the interior volume of the cell with a liquid crystal material. A barrier is provided internally of the cell having one end joined to the seal material adjacent one side of the fill opening and having its other end extending beyond the fill opening parallel to at least one side of the display cell. The barrier extends between the glass plates, being sealed thereto, and opens into the internal volume of the cell to provide a channel communicating between the fill opening and said internal volume. After the cell is filled with liquid crystal material the channel is closed by a wax plug, such as a plug of high molecular weight hydrocarbon wax, and the fill opening is sealed by an epoxy or glass plug.

16 Claims, 5 Drawing Figures

SEAL FOR LIQUID CRYSTAL DISPLAY CELL

BACKGROUND OF THE INVENTION

The present invention relates to liquid crystal display cells, and more particularly to liquid crystal display cells constructed with an improved seal for the fill opening thereof.

Liquid crystal display cells presently known in the art are generally constructed of a pair of spaced apart glass plates having transparent electrodes on the facing surfaces thereof. The plates are bonded together by a seal material about the periphery of the plates to define an inward volume adapted to confine a thin film of liquid crystal material which, when selectively addressed by voltages applied to the transparent electrodes, varies between light transmissive and opaque states to define a display image.

In manufacturing such cells it is usual to construct a closed cell containing the liquid crystal material. In the manufacturing process, this can be accomplished by forming a relatively small opening, preferably in the seal, for filling the cell with liquid crystal material. Upon completion of the fill operation, various types of plugs have been utilized to close the cell.

Sealing of the cell is a critical step in manufacture, since most known liquid crystal materials are highly susceptible to attack by various contaminants. Some contaminants are derived from the atmosphere and gain entry to the cell at the time of manufacture, or possibly later by permeating the seal of the cell. Other contaminants can originate in the seal material itself.

However, it is believed that a major cause of contamination in presently known liquid crystal cells is interaction between the liquid crystal material and the material utilized to seal the fill opening. One effect of contamination in the cell is to cause deterioration of the function or performance of the cell and thereby to reduce its useful life as a display.

SUMMARY OF THE INVENTION

Accordingly, it is an object of the invention to provide a liquid crystal display cell in which functional failure of the cell caused by pressure of contaminants is reduced, or at least sufficiently delayed so that the life of the cell is prolonged.

It is another object of the invention to provide a construction design for liquid crystal display cells which is economical and permits the use of low cost techniques to seal the cell against leakage and contamination.

These and other objects of the invention are achieved by a cell design which utilizes a barrier formed internally of the cell having one end attached to the peripheral seal of the cell adjacent the fill opening, and having a body which extends along one side of the cell adjacent the fill opening to define a capillary channel extending between the fill opening and the internal volume of the cell. The channel, after filling of the cell with liquid crystal material is accomplished, is sealed by introduction of a wax plug into the channel, and subsequent application of a plug of seal material such as an epoxy or fluorocarbon into the seal opening.

The internal barrier serves to reduce the exposure of the sealant materials to liquid crystal material and tends to trap any contamination which does reach the cell during the fill operation within the capillary channel. This reduces the contamination within the display area of the cell. In addition, the wax plug serves as a barrier agent which is interposed between the liquid crystal material and the fill opening seal, thereby reducing the exposure of liquid crystal material to substances with which it is reactive.

BRIEF DESCRIPTION OF THE DRAWINGS

These and other objects of the invention will become apparent from the following description of the invention taken in conjunction with the accompanying drawings in which.

DETAILED DESCRIPTION OF THE INVENTION

Figure 1:
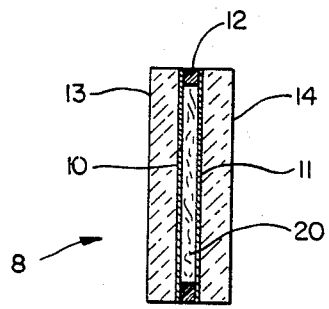
FIG. 1 is a side elevation view, in section, of a liquid crystal display device such as that illustrated in FIG. 2.
Figure 2:
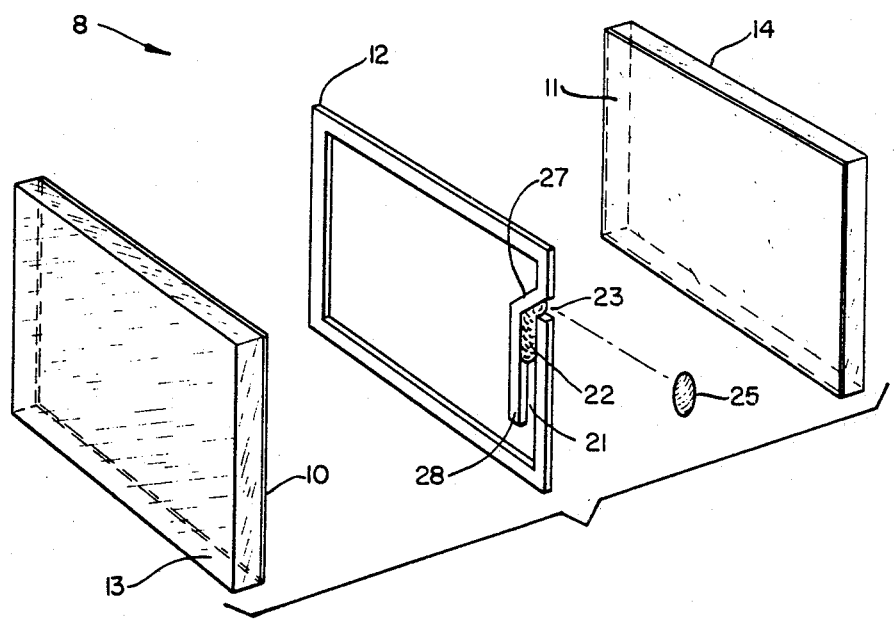
FIG. 2 is an exploded perspective view of a liquid crystal display device constructed in accordance with the invention.
Figure 3:
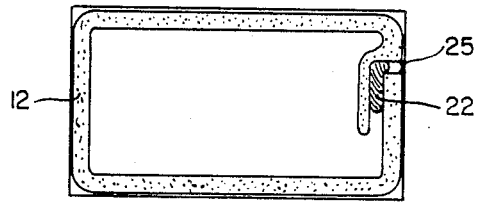
FIG. 3 is a schematic plan view, in section, of the display device of FIG. 2.

Referring now to the drawings and particularly to FIGS. 1–3, a liquid crystal display cell 8 is illustrated, being constructed of two plates of flat glass 13, 14 having transparent electrodes deposited on facing surfaces thereof, such as electrodes 10, 11. The glass plates are sealed together by a seal 12 which serves to space the plates apart and define an internal volume or cell which is adapted to contain the liquid crystal material 20. It should be understood that the showing of the figure is schematic and that the thickness of the cell volume is greatly exaggerated. In actual practice the plate spacing is chosen to suit the electrical characteristics of the liquid crystal material and particular electrode design. However, in most instances the thickness of the cell volume would range between 0.0003 and 0.0015 inches.

In the preferred embodiment, seal 12 is fabricated of glass frit or epoxy sealing material which is adherent to the electrode coated glass and forms a suitable hermetic seal therebetween. Other suitable sealants may be utilized if desired, however, depending upon such factors as plate spacing, chemical compatibility requirements with respect to the liquid crystal material, and the method of sealing which is to be employed. The seal material can be applied to the glass plates by any convenient method such as by screening, brushing, spraying or dipping. Alternately, the sealing section may be punched out from a sheet of material, such as polyethylene, with the seal then being formed by application of heat or other suitable curing with the seal in place between the glass plates.

According to the invention, a capillary channel 21 is provided, interconnecting a filling port 23 formed in the seal with the interior of the cell. One purpose of the capillary channel is to trap and thereafter contain any contaminating substance which gains entry to the cell by means of surface tension during filling of the cell. This prevents, or at least delays, contact of the contaminant with the liquid crystal material. Another purpose of the channel is to contain in semi-isolation a wax plug 22 which comprises a barrier between the liquid crystal material and a final seal 25 utilized to seal filling port 23.

The capillary channel can take different physical forms so long as the above-mentioned functions are fulfilled, as shown in FIGS. 2–5. Preferably, however, the capillary channel is formed by a segment, such as segment 27, that is attached to one side of the fill opening or formed integral with the seal. Channel 21 is otherwise bounded by a segment 28 that extends along the end of the cell substantially parallel to the end portion of seal 12.

Figure 4:
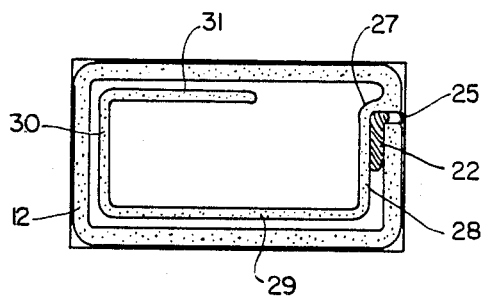
FIG. 4 is a schematic plan view, in section, of a modified embodiment of the invention.
Figure 5:
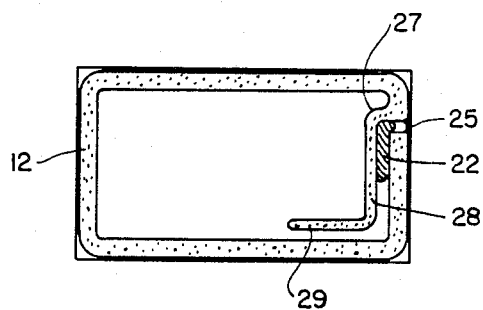
FIG. 5 is a schematic plan view, in section, of another modified embodiment of the invention.

If desired, the capillary channel can be extended about the periphery of the cell by adding additional segments, such as segment 29 in FIG. 5 and segments 30, 31, as shown in FIG. 4 to elongate the channel. This tends to provide further isolation between the fill opening and the contents of the display portion of the cell which is desirable for certain purposes. However, it should be obvious that the addition of further segments is not required for certain types of material and, in that event, the use of a shorter capillary channel may provide a similar type of cell construction.

The wax plug preferably is unreactive with both the liquid crystal material and the agent used as final seal 25. Consequently, any contamination within the manufactured cell due to chemical reactions is minimized.

It has been found that a high molecular weight hydrocarbon may be used as an effective wax barrier with most liquid crystal materials. It is desirable that the wax have a melting point higher than 150° F in order that the display be operable close to that temperature. A suitable wax for the above purpose is Microcrystalline Wax 195 manufactured by the Bareco Division of Petrolite Corporation, Tulsa, Oklahoma.

In fabrication of the cell one technique for introducing the wax plug is to place a small quantity of wax at the mouth of the fill opening and then to heat the wax to its melting temperature by application of localized heat, such as by use of a small soldering iron. The melted wax is drawn into the channel by capillary action until the heat is withdrawn, after which it will solidify and form an effective plug or barrier.

The final step in the sealing process is then to apply a small quantity of sealant to the exterior of the port to form seal 25. As previously mentioned, epoxy materials have generally been found most satisfactory for this purpose and may be applied by a variety of methods such as dropping, dabbing, dipping and the like.

Preferably, a curing temperature below the melting temperature of the wax must be employed to cure the sealant without disturbing the wax barrier. This is not a significant problem in fabrication of the cell since many epoxy materials cure satisfactorily at normal room temperatures. One such material is A11Aco 20-20 Epoxy, manufactured by Bacon Industries, Inc.

It should be apparent that the cell described herein, utilizing a capillary channel, provides advantages over liquid crystal cells employed heretofore in the prior art. Thus, the cell with the wax barrier in a capillary channel tends to minimize contamination due to elimination of electrochemical reaction between the liquid crystal material and the epoxy sealant. In addition, any contamination that is drawn into the cell during the filling process tends to remain in the capillary channel and contamination of the display portion of the cell is minimized, or at least delayed to a substantial degree.

What is claimed is:

1. In a liquid crystal display cell having a pair of glass plates in close adjacent spaced relationship being joined together along the outer periphery of the plates by a seal material having a small fill opening therein, the glass plates having transparent conductive electrodes formed on facing surfaces thereof, the cell being filled with a liquid crystal material, the improvement comprising:
   a. a barrier disposed internally of the cell in close adjacent spaced relationship to the seal material and connected to said seal material adjacent one side of the fill opening to form a capillary tube between the fill opening and the remainder of the internal portion of the cell, said barrier extending between the glass plates and being sealed to the plates; and,
   b. a wax plug disposed within a portion of said capillary tube between the liquid crystal material and the fill opening.

2. The improvement for a liquid crystal display cell claimed in claim 1 wherein:
   said wax is a high molecular weight hydrocarbon.

3. The improvement for a liquid crystal display cell claimed in claim 1 wherein:
   said wax has a melting point above 150° F.

4. The improvement for a liquid crystal display cell claimed in claim 1 and additionally comprising:
   a final seal disposed to seal the fill opening.

5. The improvement for a liquid crystal display cell claimed in claim 4 wherein:
   said final seal is an epoxy plug.

6. The improvement for a liquid crystal display cell claimed in claim 4 wherein:
   said final seal is a glass plug.

7. The improvement for a liquid crystal display cell claimed in claim 1 wherein:
   said capillary tube is of sufficient length to trap and contain any contaminating substance which gains entry to the cell by means of surface tension during filling of the cell with the liquid crystal material through the fill opening.

8. The improvement for a liquid crystal display cell claimed in claim 1 wherein:
   said barrier means is disposed continuously adjacent the seal material on more than one side of the liquid crystal display cell.

9. An improved liquid crystal display cell comprising:
   a. a pair of glass plates in close adjacent spaced relationship, said plates having transparent conductive electrodes formed on facing surfaces thereof;
   b. a liquid crystal material disposed between said plates;
   c. a sealing material disposed along the outer periphery of the facing surfaces of said plates and being bonded to both plates to define an internal volume containing said liquid crystal material, said sealing material having a fill hole therein between the outside of the cell and said internal volume, said seal material being disposed additionally from a point on one side of said fill hole behind said fill hole and parallel to said seal material on the opposite side of said fill hole in close spaced relationship whereby a capillary tube is formed between said fill hole and said internal volume;
   d. a wax plug disposed in said capillary tube between said liquid crystal material and said fill hole; and,
   e. a final seal disposed to close said fill hole.

10. The improved liquid crystal display cell claimed in claim 9 wherein:
    said wax is a high molecular weight hydrocarbon having a melting point above 150° F.

11. The improved liquid crystal display cell claimed in claim 9 wherein:

said capillary tube is of sufficient length to trap and contain any contaminating substance entering the cell through said fill hole.

12. The improved liquid crystal display cell claimed in claim 9 wherein:

said capillary tube is disposed along more than one side of the periphery of said internal volume of the cell.

13. The improved method of sealing a liquid crystal display cell having a pair of glass plates in closed adjacent spaced relationship being joined together along the outer periphery of the plates by a seal material having a small fill opening therein, the glass plates having transparent conductive electrodes formed on facing surfaces thereof, the cell having an internally formed capillary tube between the fill opening and the remainder of the internal portion of the cell, the cell being filled with a liquid crystal material, the improved method comprising the steps of:

a. placing a small quantity of wax in contact with the fill opening;
b. heating the wax to its melting temperature by applying localized heat whereby the melted wax will be drawn into the capillary tube by capillary action;
c. removing the heat from the wax whereby the wax will solidify and form a plug within the capillary tube; and,
d. placing a final seal material into the fill opening.

14. The method of claim 13 wherein:
the wax is a high molecular weight hydrocarbon.

15. The method of claim 13 wherein:
the wax has a melting point above 150° F.

16. The method of claim 13 wherein:
the final seal material is an epoxy material having a cure temperature below the melting temperature of the wax.

* * * * *